(12) United States Patent
Fast et al.

(10) Patent No.: US 7,516,132 B1
(45) Date of Patent: Apr. 7, 2009

(54) MECHANISM FOR ENABLING DISTRIBUTED FILE SHARING AMONG A PLURALITY OF NODES IN A NETWORK

(75) Inventors: Todd A. Fast, San Francisco, CA (US); Ayub S. Khan, Menlo Park, CA (US); Yang Su, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 475 days.

(21) Appl. No.: 10/987,567

(22) Filed: Nov. 12, 2004

(51) Int. Cl.
*G06F 7/00* (2006.01)

(52) U.S. Cl. .................. 707/8; 707/104.1; 709/203; 709/219

(58) Field of Classification Search ............ 707/8, 707/201, 104.1; 717/168; 709/203, 206, 709/207, 219; 715/742, 751, 754
See application file for complete search history.

(56) References Cited

U.S. PATENT DOCUMENTS

| | | | | |
|---|---|---|---|---|
| 5,337,407 A | * | 8/1994 | Bates et al. | 715/751 |
| 5,339,388 A | * | 8/1994 | Bates et al. | 715/742 |
| 5,339,389 A | * | 8/1994 | Bates et al. | 715/742 |
| 5,515,491 A | * | 5/1996 | Bates et al. | 715/754 |
| 2005/0004986 A1 | * | 1/2005 | Aoki et al. | 709/206 |
| 2006/0031367 A1 | * | 2/2006 | Buford et al. | 709/207 |
| 2006/0039545 A1 | * | 2/2006 | Rahman et al. | 379/142.01 |

OTHER PUBLICATIONS

SubEthaEdit—Features [online], [retrieved on Feb. 18, 2005]. Retrieved from <URL: http://www.codingsmonkeys.de/subethaedit/features.html>.
SubEthaEdit—Collaborate [online], [retrieved on Feb. 18, 2005]. Retrieved from <URL: http://www.codingmonkeys.de/subethaedit/collaborate.html>.

* cited by examiner

*Primary Examiner*—Leslie Wong
*Assistant Examiner*—Dung K Chau
(74) *Attorney, Agent, or Firm*—Hickman Palermo Truong & Becker LLP

(57) ABSTRACT

A mechanism is disclosed for enabling a plurality of nodes on a network to collaboratively share a file. In one implementation, each node maintains its own copy of the file, and each node may make updates to its copy of the file. Whenever a node does update the contents of a region of the file, that node sends out an update message. The update message comprises the updated content for the region that has been updated. The update message is forwarded to each of the other nodes. When each of the other nodes receives the update message, it updates its copy of the file with the updated content for the region. In this manner, the file is kept in sync on each of the nodes, and the user on each node is able to see changes made by users on the other nodes. Collaboration among the users is thus achieved.

41 Claims, 10 Drawing Sheets

MECHANISM FOR ENABLING DISTRIBUTED FILE SHARING AMONG A PLURALITY OF NODES IN A NETWORK

BACKGROUND

In many work scenarios, it is desirable for a plurality of workers to collaborate on a project to find a solution to a problem. For example, in the context of software development, it is often desirable for a plurality of developers to collaborate to write the source code for a particularly difficult part of a program. With such collaboration, the solution is often discovered faster than if the individuals had worked on the problem by themselves.

Collaboration can be achieved in many different ways. One possible way is to physically gather all of the people so that they are present and working together in the same location. With workers spread throughout the country and throughout the world, however, this is often not practical. Collaboration may also be achieved electronically. With tools such as instant messaging, email, and electronic file transfer, workers can collaborate by sending messages and files to each other. For example, a developer may email a portion of source code to a colleague and ask the colleague for advice on how to implement a particular functionality. The colleague can then edit the source code and send the updated source code back. While these tools do enable workers to communicate and exchange ideas, they do not truly enable the workers to collaborate in the full sense of the word. Each worker cannot see what the other is doing while he is doing it, and there are often significant delays between the request for information/advice and the receipt thereof. Thus, the collaboration is not very interactive.

To facilitate more interactive collaboration, some computing tools have been developed in recent years that allow multiple parties using multiple machines (e.g. computers) to view a file at the same time. With such tools, the file may be edited by one of the workers, and the edits may be viewed by all of the other workers. Some of these tools even allow different workers to take turns making edits to the file. While such tools do represent improvements over the previous approaches, they still have significant limitations. For example, these tools allow only one worker to make edits to the file at a time. Because of this and other limitations, these tools are not as fully interactive and collaborative as would be desired. As a result, an improved collaboration mechanism is needed.

SUMMARY

In accordance with one embodiment of the present invention, there is provided a system which enables multiple users on multiple nodes of a network to fully and interactively collaborate on a file. In one embodiment, the system comprises a first node, a second node, and a network for communicatively coupling the first and second nodes. The system may also optionally comprise a message broker for facilitating message exchange between the nodes. The first and second nodes may share a file, which has a first region comprising a first set of content, and a second region comprising a second set of content. In one embodiment, each node maintains its own copy of the file; thus, the first node maintains a first copy of the file and the second node maintains a second copy of the file. The first node generates a first display to show to a first user at least a portion of the first copy of the file, and the second node generates a second display to show to a second user at least a portion of the second copy of the file. With these aspects in place, the first and second users can collaborate on the file.

At some point during the collaboration, the first node receives input from the first user to update the first region of the file. In response, the first node updates the first region of its copy (i.e. the first copy) of the file with a first set of updated content. The first node then sends a first update message to inform the second node of this update. In one embodiment, the first update message comprises the first set of updated content, and is sent to the message broker, which in turn forwards it to the second node. Upon receiving the first update message, the second node updates the first region of its copy (i.e. the second copy) of the file with the first set of updated content. By doing so, the second node in effect synchronizes the first region of its copy of the file with the first region of the copy of the file on the first node. Thereafter, the second node automatically refreshes the second display so that it shows the first set of updated content in the first region. In this manner, the second user on the second node is able to see the update made by the first user on the first node.

Similarly, at some point during the collaboration, the second node receives input from the second user to update the second region of the file, and in response, the second node updates the second region of its copy (i.e. the second copy) of the file with a second set of updated content. The second node then sends a second update message to inform the first node of this update. In one embodiment, the second update message comprises the second set of updated content, and is sent to the message broker, which in turn forwards it to the first node. Upon receiving the second update message, the first node updates the second region of its copy (i.e. the first copy) of the file with the second set of updated content. The first node thus synchronizes the second region of its copy of the file with the second region of the copy of the file on the second node. Thereafter, the first node automatically refreshes the first display so that it shows the second set of updated content in the second region. In this manner, the first user on the first node is able to see the update made by the second user on the second node.

In the manner described above, multiple users on multiple nodes may make updates to a file, and those updates can be seen by all users on all nodes that are sharing the file. In one embodiment, multiple users may make updates to different regions of the file at the same time. For example, the first user on the first node may update the first region of the file at the same time that the second user on the second node is updating the second region of the file. By enabling multiple users to update a file at the same time, and by showing the updates to all users on all nodes that are sharing the file, this system makes it possible for multiple users on multiple nodes to fully and interactively collaborate on a file.

DETAILED DESCRIPTION OF EMBODIMENT(S)

System Overview

Figure 1:
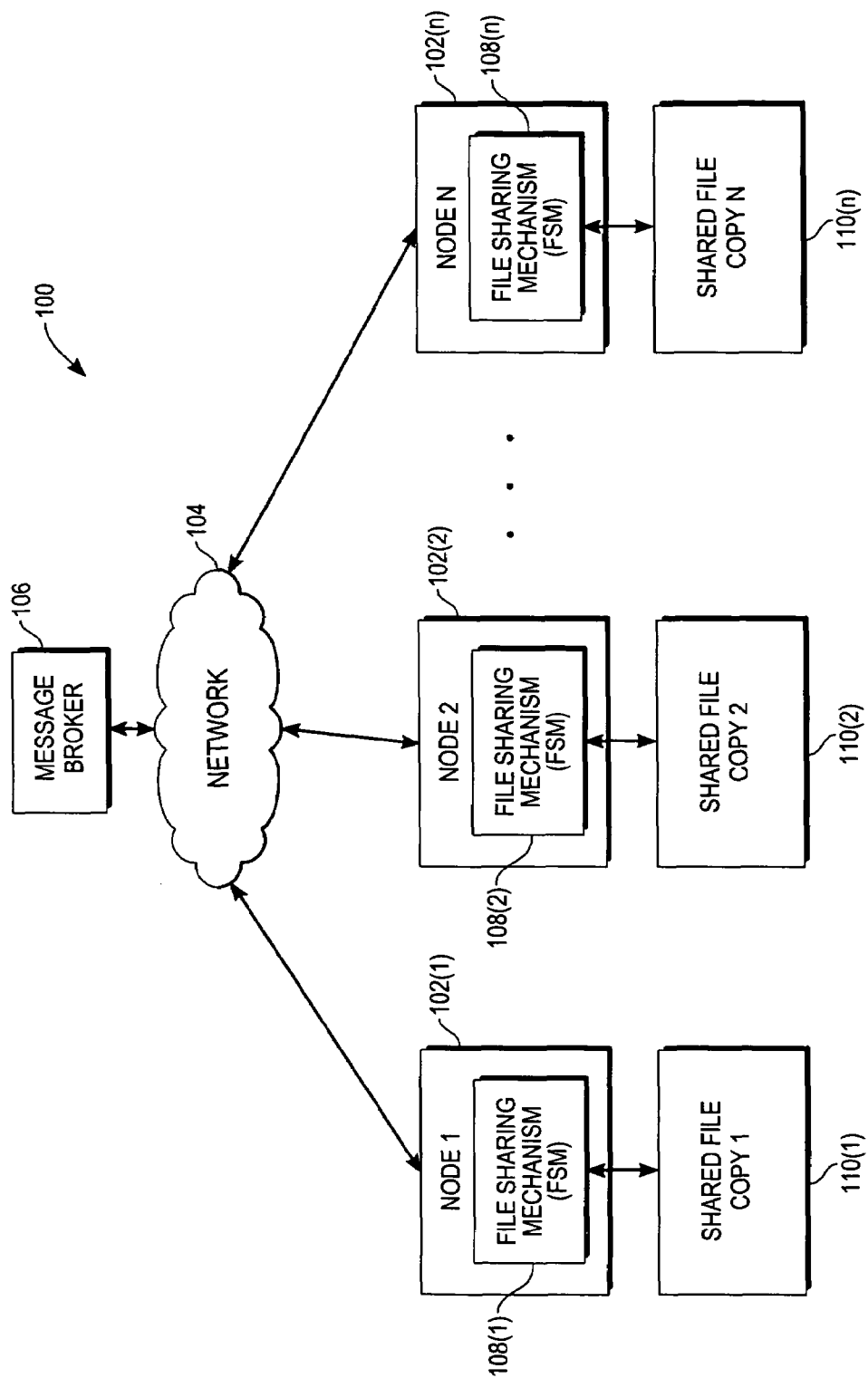
FIG. 1 is a functional block diagram of a system in which one embodiment of the present invention may be implemented.

With reference to FIG. 1, there is shown a functional block diagram of a system 100 in which one embodiment of the present invention may be implemented. As shown, the system 100 comprises a plurality of nodes 102, and a network 104 for communicatively coupling the nodes 102 to each other. For purposes of the present invention, the network 104 may be any type of network, including but not limited to, a local area network (LAN) and a wide area network (WAN), such as the Internet. Anything that enables the nodes 102 to communicate with each other may be used as network 104.

For purposes of the present invention, each node 102 may be any device that can couple to a network 104 and interact with other nodes 102 to collaboratively share a file. As an example, a node 102 may be a desktop or portable computer, such as the sample computer system shown in FIG. 5. In one embodiment, each node 102 comprises one or more user interface components that enable the node 102 to receive input from, and provide output to, a user. For example, a node 102 may comprise a keyboard and a cursor control device (e.g. a mouse, trackball, stylus, pointing device, etc.) to enable a user to make user interface selections and to enter alpha numeric data. A node 102 may also comprise a display for displaying information, such as a file, to a user.

To enable it to collaboratively share a file with one or more other nodes 102, each node 102 comprises a file sharing mechanism (FSM) 108. In one embodiment, it is this FSM 108 on each node 102 that allows a user to update a shared file, and to propagate that update to other nodes 102 in the system 100. It is also the FSM 108 that enables a node to update a shared file based upon updates made by other users on other nodes. The operation of the FSM 108 will be elaborated upon in a later section. For purposes of the present invention, the functionality of the FSM 108 may be implemented in various ways. For example, if a node 102 takes the form of a computer, then the FSM 108 may be implemented as a set of instructions executed by the computer. As an alternative, the FSM 108 may be implemented using hardwired logic components, such as that embodied in an ASIC. These and other implementations of the FSM 108 are within the scope of the present invention.

In addition to the nodes 102 and the network 104, the system 100 may also optionally comprise a message broker 106. In one embodiment, the message broker 106 facilitates communication between the various nodes 102 by receiving a message from one node 102 and forwarding that message to the other nodes. By doing so, the message broker 106 allows the nodes to communicate with each other by interacting with just one central component (the message broker 106). The nodes 102 need not communicate with each other in a peer-to-peer fashion; thus, the communication management that each node 102 needs to perform is simplified. For purposes of the present invention, the functionality of the message broker 106 may be implemented in various ways. For example, it may be implemented by having a computer (such as the sample computer system shown in FIG. 5) execute a set of instructions. Alternatively, the functionality of the message broker 106 may be implemented using hardwired logic components, such as that embodied in an ASIC. These and other implementations are within the scope of the present invention.

As alluded to previously, each node 102 may collaboratively share a file (or more than one file) with one or more other nodes 102 in the system 100. In one embodiment, when a node 102 shares a file with one or more other nodes 102, it maintains its own distinct copy of the shared file. Thus, as shown in FIG. 1, node 102(1) maintains a first copy 110(1) of the file, node 102(2) maintains a second copy 110(2) of the file, and node 102(n) maintains an nth copy 110(n) of the file. Because each node 102 maintains its own copy of the file, each node can update its copy of the file at almost any time (with some restrictions, as will be elaborated upon in a later section). Thus, it is possible for multiple users on multiple nodes to update the file at the same time. This is in sharp contrast to the prior art, which allowed only one user to update a file at a time. Because there are multiple copies of the file, there is an issue of how to synchronize the various copies to keep them consistent with each other. In one embodiment, this task falls on the FSM 108 on each node 102. As will be discussed in greater detail in a later section, it is up to the FSM's 108 to communicate with each other so that the updates made to a copy of the file on one node are reflected on the copies of the file on other nodes. When done properly, this enables a user on one node to see the updates made by a user on another node. The users on the various nodes are thus able to collaborate on the file.

Figure 2:
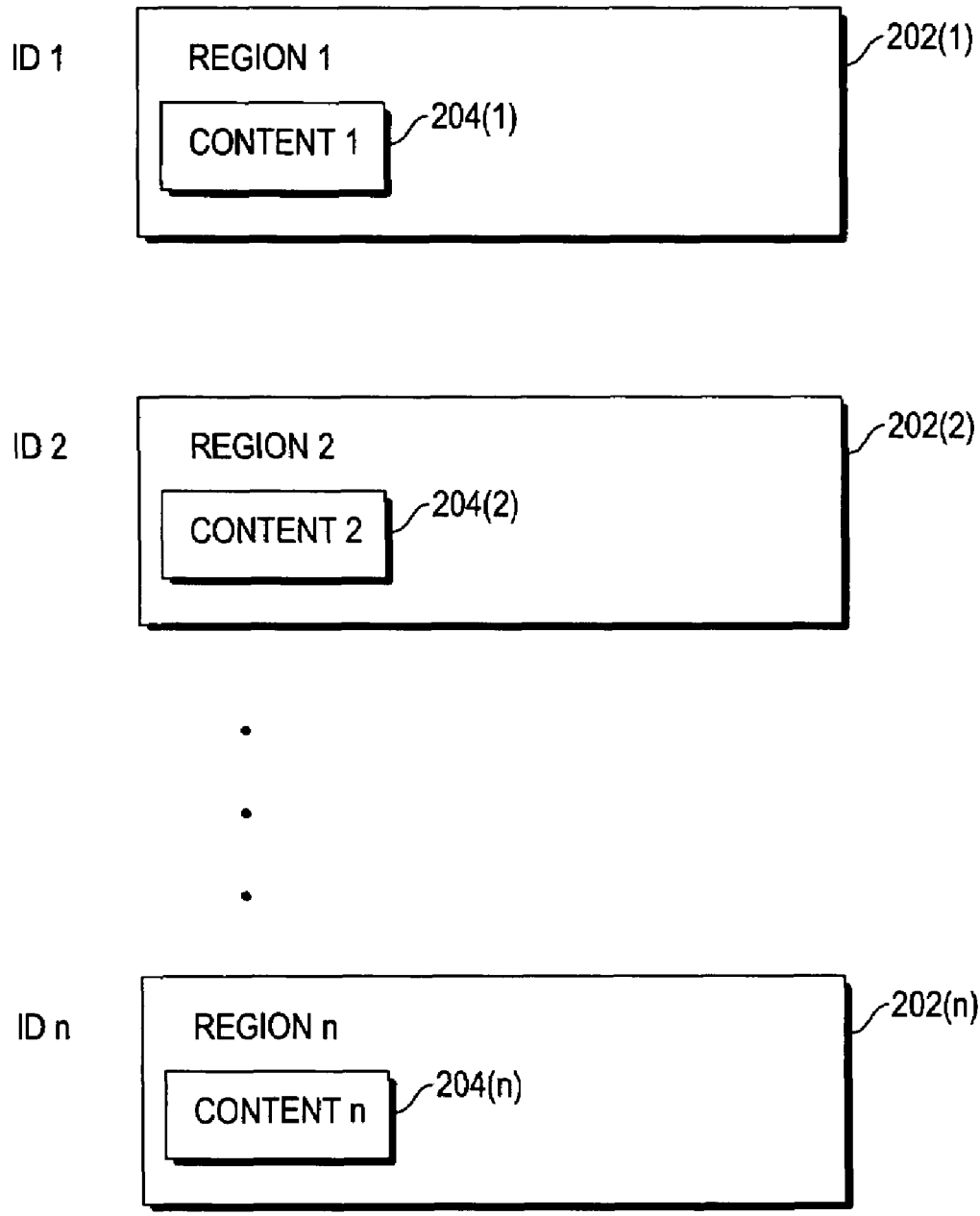
FIG. 2 shows an example of a file that can be collaboratively shared among a plurality of nodes, in accordance with one embodiment of the present invention.

FIG. 2 shows an example of a file 110 that may be collaboratively shared among a plurality of nodes 102. For purposes of the present invention, file 110 may be any type of file. For example, file 110 may be a text file, a word processing file, a graphics file, etc. As shown, file 110 comprises a plurality of regions 202, with each region 202 comprising a set of content 204. The content 204 in each region 202 may be any type of content, including but not limited to, text, graphics, data, binary information, etc. Each region 202 may have any desired level of granularity. For example, if the file 110 is a text file, a region may be a single character of text, a word of text, a line of text, or multiple lines of text. For purposes of the present invention, each region 202 may represent as small or as large a granularity of information as desired.

Each region 202 has a region identifier associated therewith. This identifier uniquely identifies a particular region 202 within the file 110. In the example of FIG. 2, ID1 is associated with region 1 202(1), ID2 is associated with region 2 202(2), and IDn is associated with region n 202(n). In one embodiment, these identifier-region associations are maintained across all copies of the shared file 110. Thus, regardless of the copy of the file 110, and regardless of which node 102 is maintaining the copy of the file, ID1 is associated with region 1 202(1), ID2 is associated with region 202(2), and so forth. As will be made clear in a later section, keeping these associations consistent across all copies of the file 110 simplifies the process of synchronizing the various copies.

Sample Operation of System

Figure 3A:
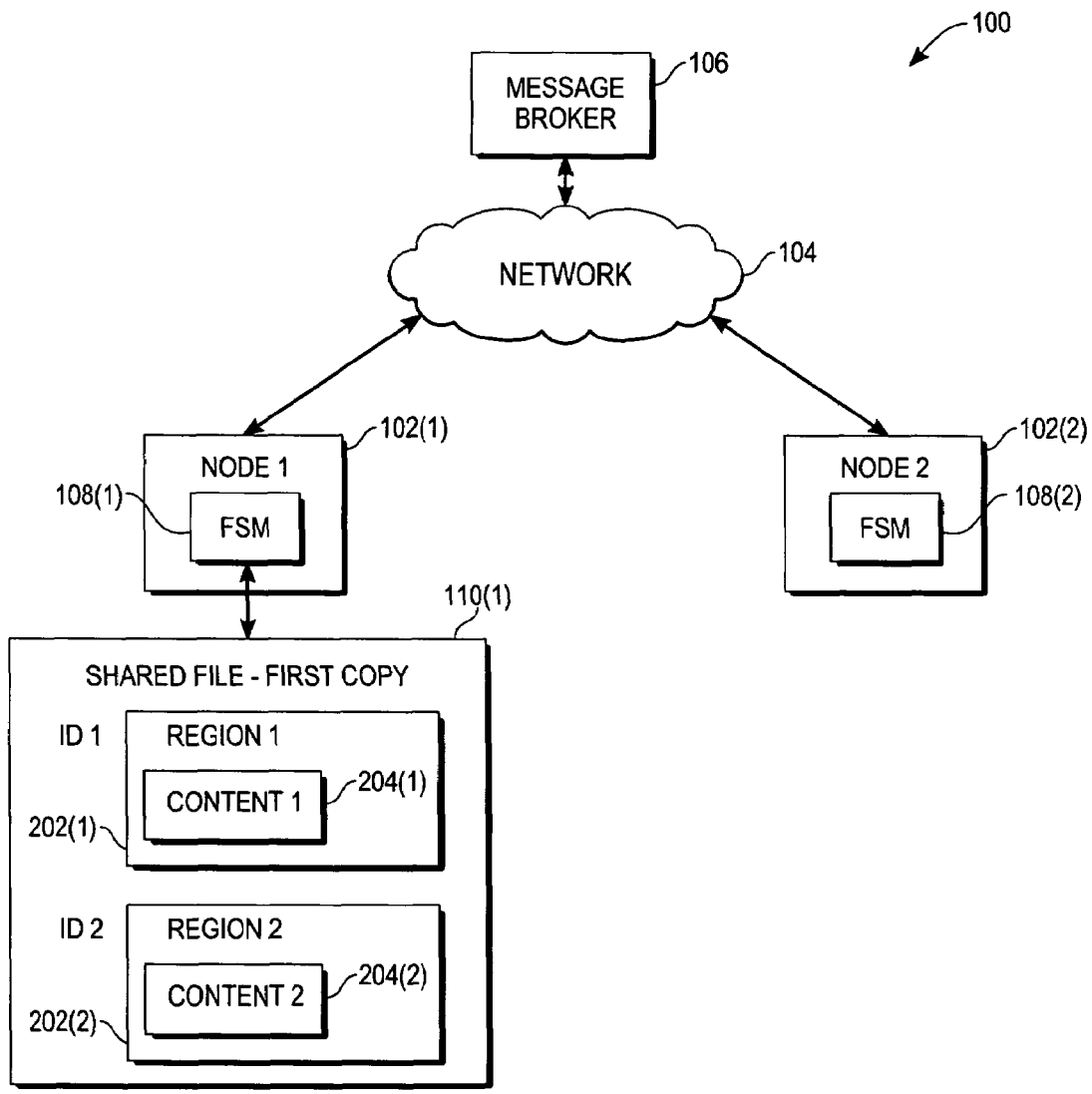
FIGS. 3A-3F illustrate the various stages of file sharing between multiple nodes, in accordance with one embodiment of the present invention.
Figure 3B:
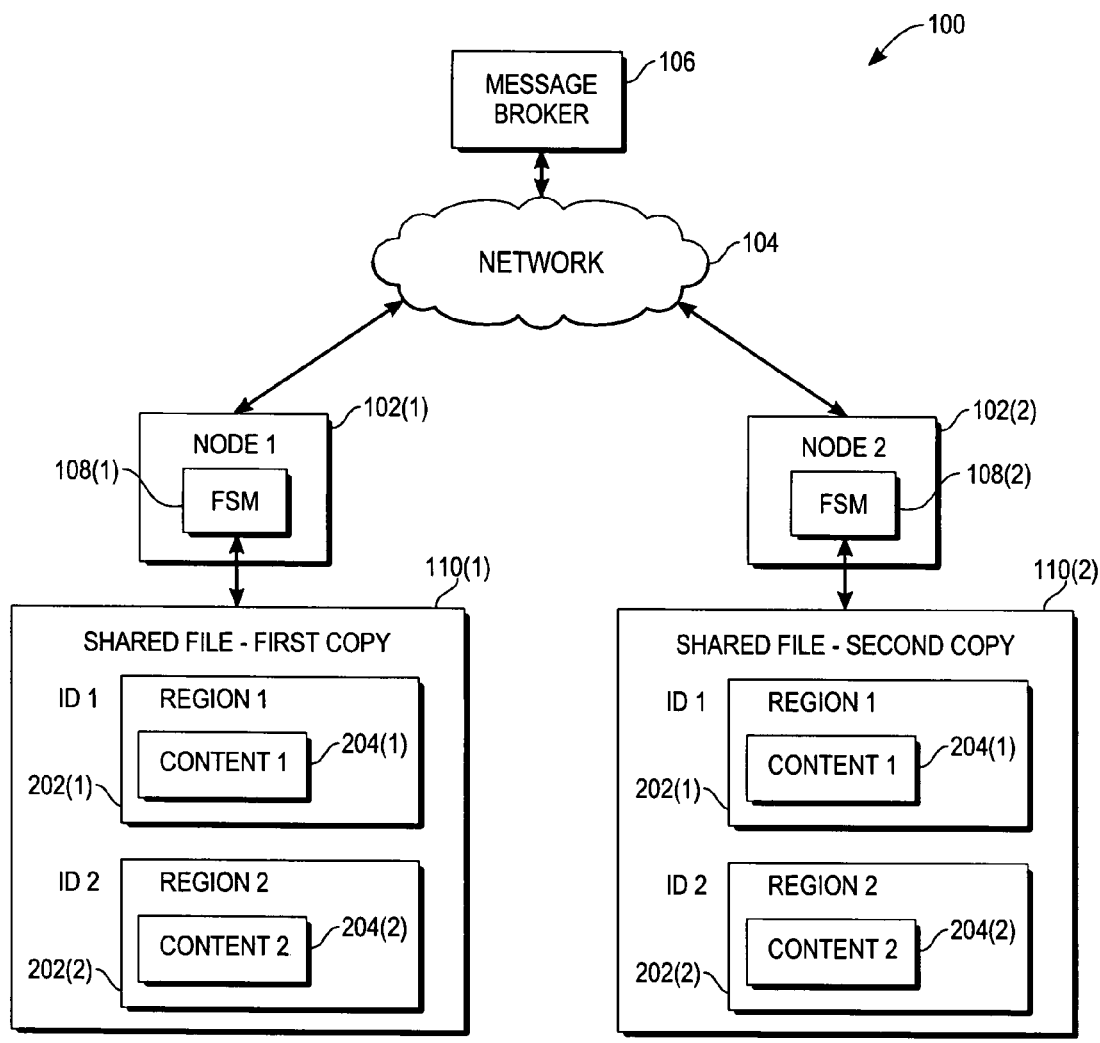
Figure 3C:
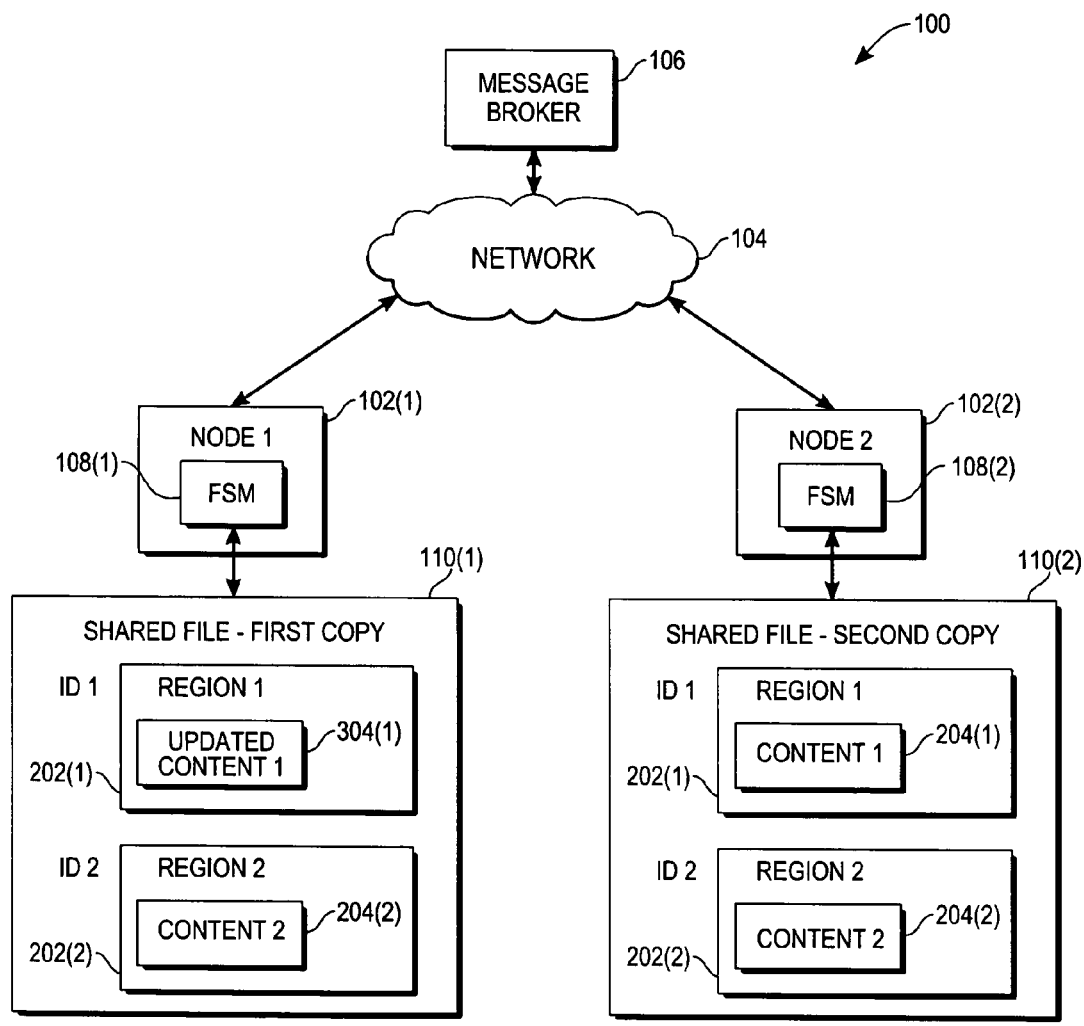
Figure 3D:
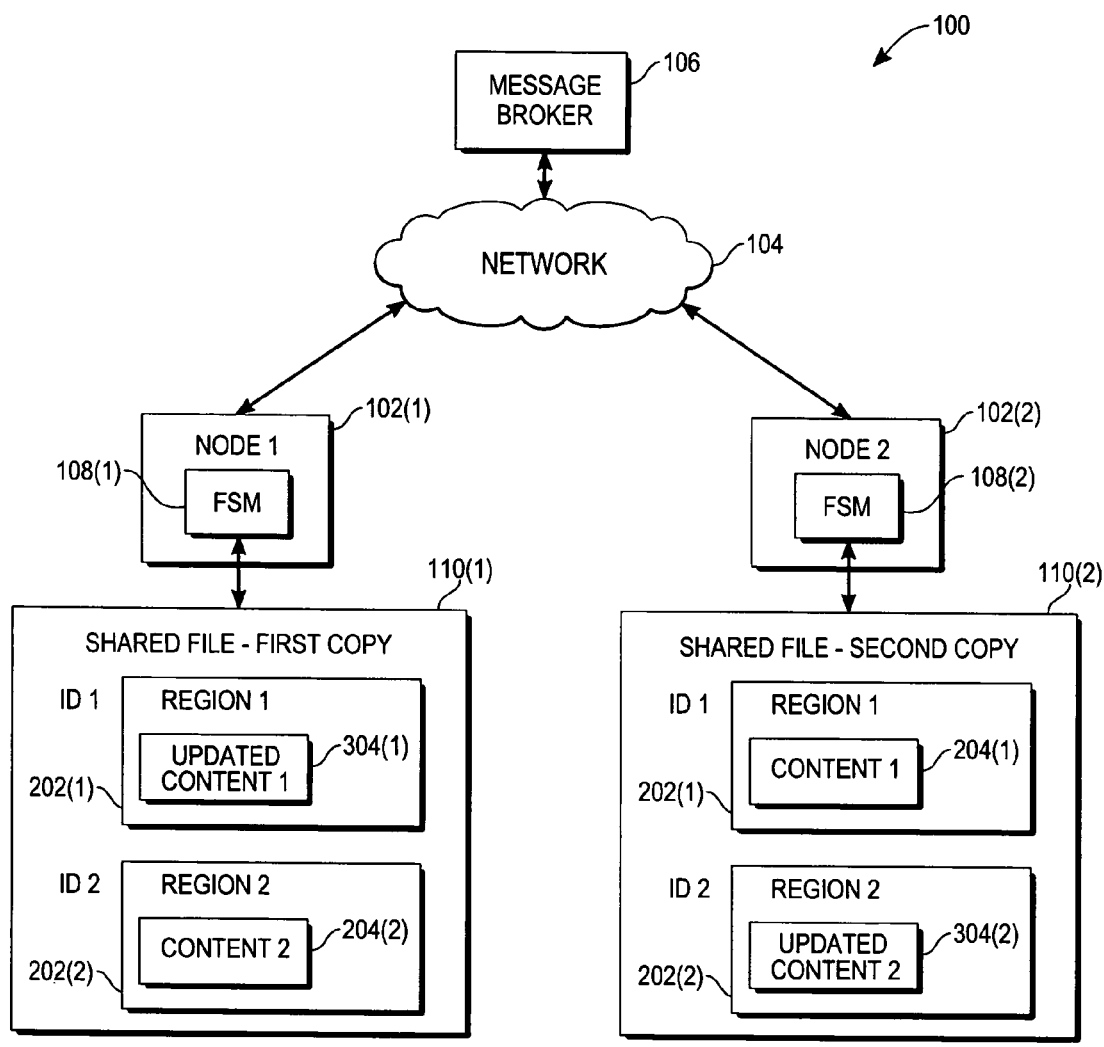

To illustrate how a file may be collaboratively shared among a plurality of nodes 102 in accordance with one embodiment of the present invention, reference will now be made to an example. In the following discussion, reference will be made to the system diagrams of FIGS. 3A-3F, and to the operational diagram of FIG. 4. FIG. 4 shows the operation of the FSM 108(1) on node 1 102(1) in accordance with one embodiment of the present invention. In the following discussion, it will be assumed that file sharing is implemented between two nodes 102(1), 102(2) (FIG. 3A). It will also be assumed that the file being shared is the file shown in FIG. 2. For the sake of simplicity, only the first two regions 202(1), 202(2) of the file are shown in FIGS. 3A-3F. It will also be assumed that initially, the file is maintained by node 1 102(1) (see FIG. 3A). Thus, node 1 102(1) is the "owner" of the file, and maintains (block 402 of FIG. 4) the first copy 110(1) thereof.

Initially, the file is not shared. To enable it to be shared, the FSM 108(1) of node 1 102(1), under direction of a first user, sends a message (which, in one embodiment, includes the ID and network address of node 1 102(1)) to message broker 106 to start a file sharing session. In one embodiment, this and all other messages are sent using an instant messaging protocol. For purposes of the present invention, any messaging protocol may be used, including but not limited to XMPP (extensible messaging and presence protocol). In response to this message, the message broker 106 starts a file sharing session, gives that session a session ID, and adds the ID and network address of node 1 102(1) to the session. The message broker 106 then returns the session ID to FSM 108(1). Thereafter, FSM 108(1), using the session ID, sends a message (which, in one embodiment, includes the name of the file) to the message broker 106 to add the file to the session. The file may now be collaboratively shared with other nodes as part of the file sharing session.

At some point, the FSM 108(1) of node 1 102(1), under direction of the first user, sends an invitation to the message broker 106 to invite node 2 102(2) to join the file sharing session. In one embodiment, this invitation message comprises the session ID, and the ID and network address of node 2 102(2). In turn, the message broker 106 forwards the invitation to node 2 102(2). At that point, a second user on node 2 102(2) can accept or decline the invitation. If the invitation is declined, then FSM 108(2) on node 2 102(2) sends a decline message to the message broker 106, which forwards the message to node 1 102(1). Node 1 102(1) is thus informed that its invitation has been declined. However, if the invitation is accepted, then FSM 108(2) on node 2 102(2) sends an accept message to the message broker 106. In response, the message broker 106 adds the ID and network address of node 2 102(2) to the session, and forwards the accept message to node 1 102(1). Node 2 102(2) is thus added to the session, and node 1 102(1) is informed of the acceptance by node 2 102(2).

Thereafter, using the session ID, FSM 108(2) on node 2 102(2) sends a join message to the message broker 106. Upon receiving this message, the message broker 106, forwards the join message to all of the other nodes in the file sharing session (which, in this example, is node 1 102(1)). In response to this message, the FSM 108(1) on node 1 102(1) sees that it is the owner of file 110(1); hence, it sends a copy of the file 110(1) to the message broker 106. In turn, the message broker 106 forwards the file to the FSM 108(2) on node 2 102(2). As shown in FIG. 3B, the FSM 108(2) now has its own copy 110(2) of the file, which it will maintain. With that done, the nodes 102(1), 102(2) are now ready to collaboratively share the file. At this point, the two copies 110(1), 110(2) of the file are identical in content.

To enable users to collaborate on the file, each of the FSM's 108(1), 108(2) generates a display of its copy of the file. Specifically, FSM 108(1) generates (block 404 of FIG. 4) a first display to show at least a portion of the first copy 110(1) of the file to the first user, and FSM 108(2) generates a second display to show at least a portion of the second copy 110(2) of the file to the second user. With this done, the users may now make updates, and hence, collaborate on the file.

Suppose now that the FSM 108(1) on the first node 102(1) receives user input indicating that the first user wishes to make an update to the content of region 1 202(1). In one embodiment, before allowing this to happen, the FSM 108(1) determines whether region 1 202(1) of the file has been locked. If so, the FSM 108(1) will not allow any user updates to region 1 202(1). In the current example, region 1 202(1) is not currently locked. Thus, FSM 108(1) will allow the first user to update region 1 202(1).

To do so, the FSM 108(1) sends a lock message to the message broker 106. In one embodiment, this lock message includes the ID (ID1) associated with region 1 202(1). Basically, this lock message instructs the other nodes in the file sharing session to lock region 1 202(1) so that they will not allow any user updates to region 1 202(1) of their copies of the file. Locking region 1 202(1) in this manner ensures that, while node 1 102(1) is updating region 1 202(1), no other nodes will be updating that same region. This helps to prevent conflicts between the various copies of the file. Upon receiving this lock message, the message broker 106 forwards it to the other nodes in the file sharing session (which, in this example, is node 2 102(2)). When the FSM 108(2) on node 2 102(2) receives this lock message, it responds by locking region 1 202(1). Thus, user updates to region 1 202(1) of the second copy 110(2) of the file are disallowed.

With that done, the FSM 108(1) on node 1 102(1) is now free to update region 1 202(1). Accordingly, FSM 108(1) receives user updates from the first user, and updates (block 406 of FIG. 4) the content in region 1 202(2) of the first copy 110(1) of the file to give rise to a first set of updated content 304(1) (see FIG. 3C). The first region 202(1) of the first copy 110(1) of the file is thus updated. At this point, only the first user on the first node 102(1) sees this update. The update has not been propagated to the other nodes.

Suppose now that at the same time the first user is updating region 1 202(1) of the first copy 110(1) of the file, the FSM 108(2) on the second node 102(2) receives user input indicating that the second user wishes to make an update to the content of region 2 202(2). Before allowing this to happen, the FSM 108(2) determines whether region 2 202(2) of the file has been locked. In the current example, region 1 202(1) is locked, but region 2 202(2) is not currently locked. Thus, FSM 108(2) will allow the second user to update region 2 202(2).

To do so, the FSM 108(2) sends to the message broker 106 a lock message, which in one embodiment, includes the ID (ID2) associated with region 2 202(2). Upon receiving this lock message, the message broker 106 forwards it to the other nodes in the file sharing session (which, in this example, is node 1 102(1)). When the FSM 108(1) on node 1 102(1) receives this lock message, it responds by locking region 2 202(2). Thus, user updates to region 2 202(2) of the first copy 110(1) of the file are disallowed.

With that done, the FSM 108(2) of node 2 102(2) is now free to update region 2 202(2). Accordingly, FSM 108(2) receives user updates from the second user, and updates the content in region 2 202(2) of the second copy 110(2) of the file to give rise to a second set of updated content 304(2) (see FIG. 3D). The second region 202(2) of the second copy 110(2) of the file is thus updated. At this point, only the second user on the second node 102(2) sees this update. The update has not been propagated to the other nodes. In one embodiment, the second user on node 2 102(2) may update the content in region 2 202(2) at the same time that the first user on node 1 102(1) is updating the content in region 1 202(1). Thus, multiple users on multiple nodes may update different regions of the file at the same time.

To propagate the updates to all nodes in the file sharing session, the FSM's 108(1), 108(2) send out update messages. Specifically, the FSM 108(1) on node 1 102(1) sends (block 408 of FIG. 4) a first update message to the message broker 106. In one embodiment, this update message comprises the ID (ID) associated with region 1 202(1), and the first set of updated content 304(1). Similarly, the FSM 108(2) on node 2 102(2) sends a second update message to the message broker 106. In one embodiment, this update message comprises the ID (ID2) associated with region 2 202(2), and the second set of updated content 304(2). In effect, these messages represent an attempt by each node to inform the other nodes in the file sharing session of the updates that that node has made. Upon receiving these messages, the message broker 106 forwards the first update message to the FSM 108(2) on node 2 102(2), and forwards the second update message to the FSM 108(1) on node 1 102(1).

Figure 3E:
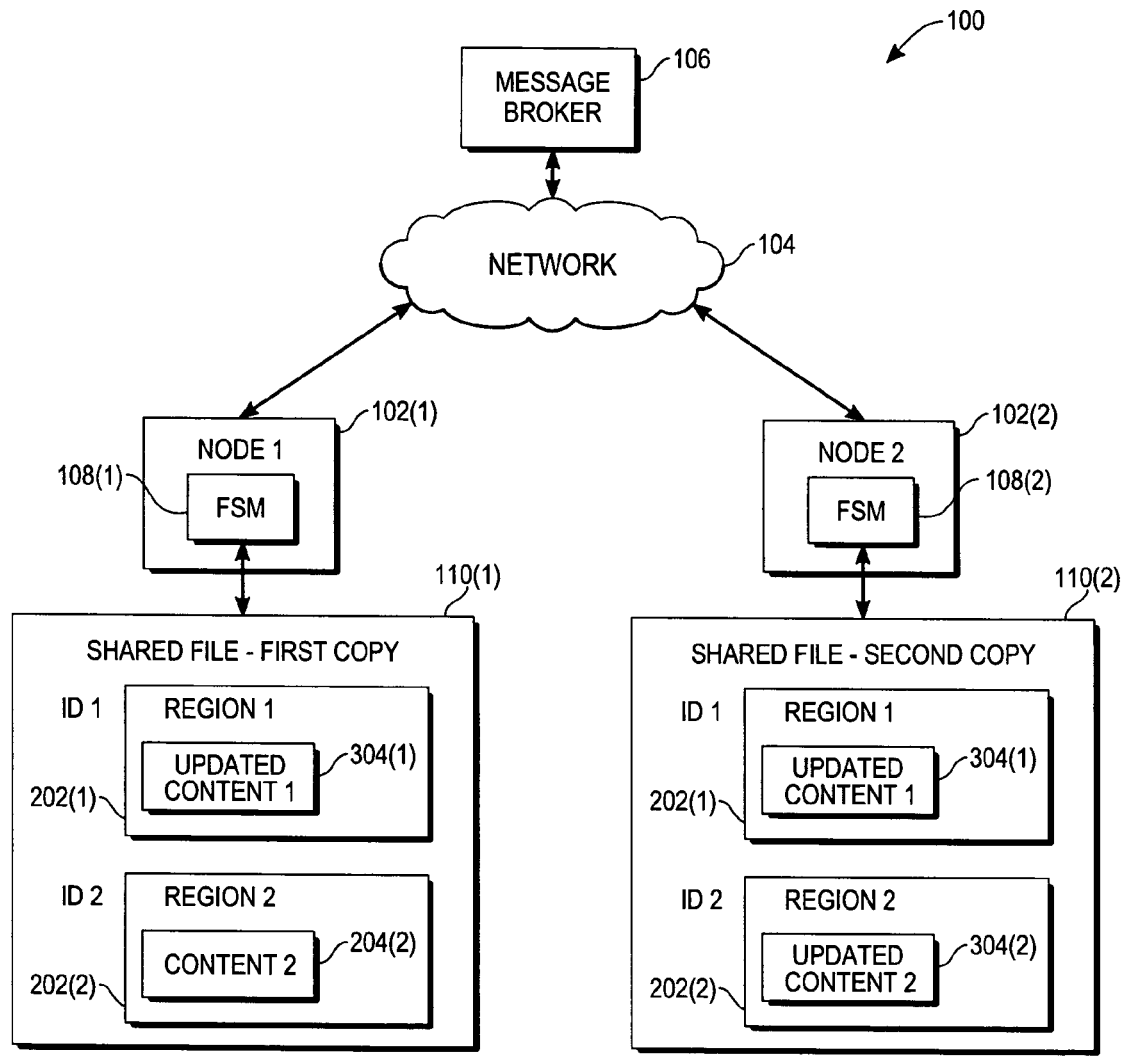
Figure 4:
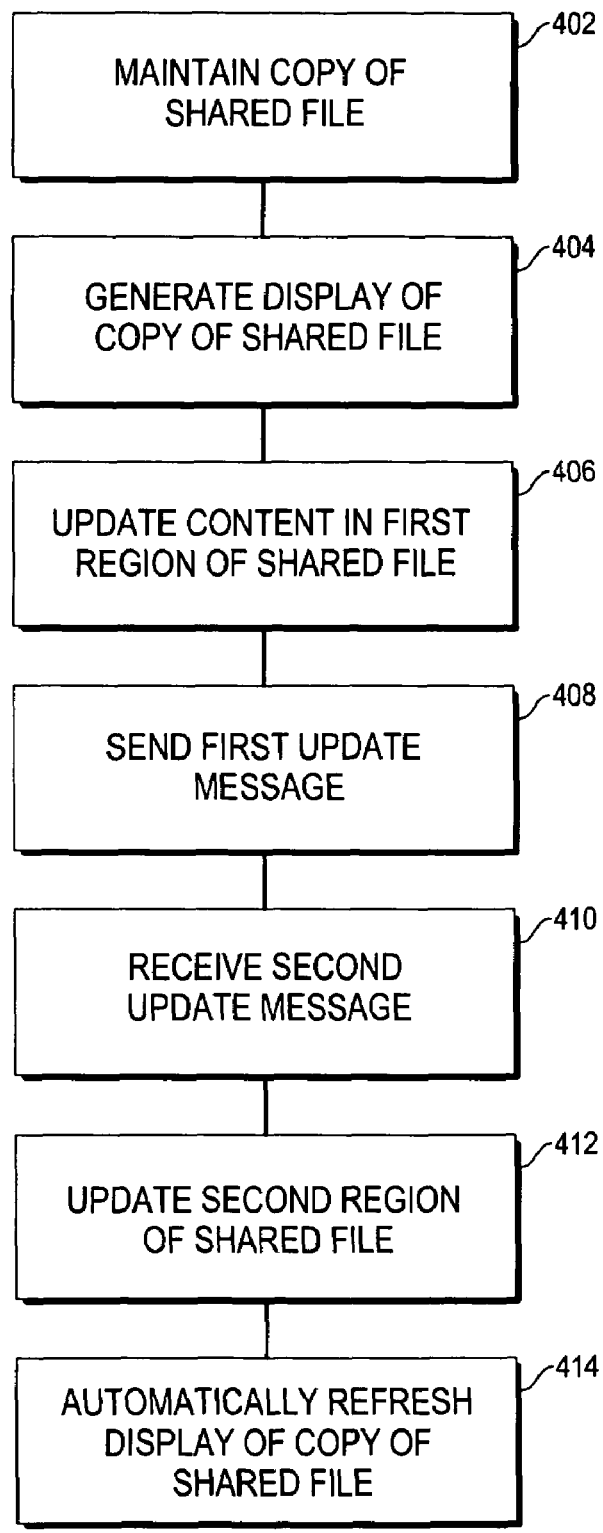
FIG. 4 is an operational diagram for a node, illustrating how a file is collaboratively shared in accordance with one embodiment of the present invention.

In response to the first update message, the FSM 108(2) on node 2 102(2) updates the content in region 1 202(1) of the second copy 110(2) of the file with the first set of updated content 304(1) (see FIG. 3E). The first region 202(1) of the second copy 110(2) of the file is thus synchronized with the first region 202(1) of the first copy 110(1) of the file. Thereafter, the FSM 108(2) automatically refreshes the display of the second copy 110(2) of the file to show the first set of updated content 304(1) in the first region 202(1). The second user on node 2 102(2) is thus able to see the updates made by the first user on node 1 102(1).

Figure 3F:
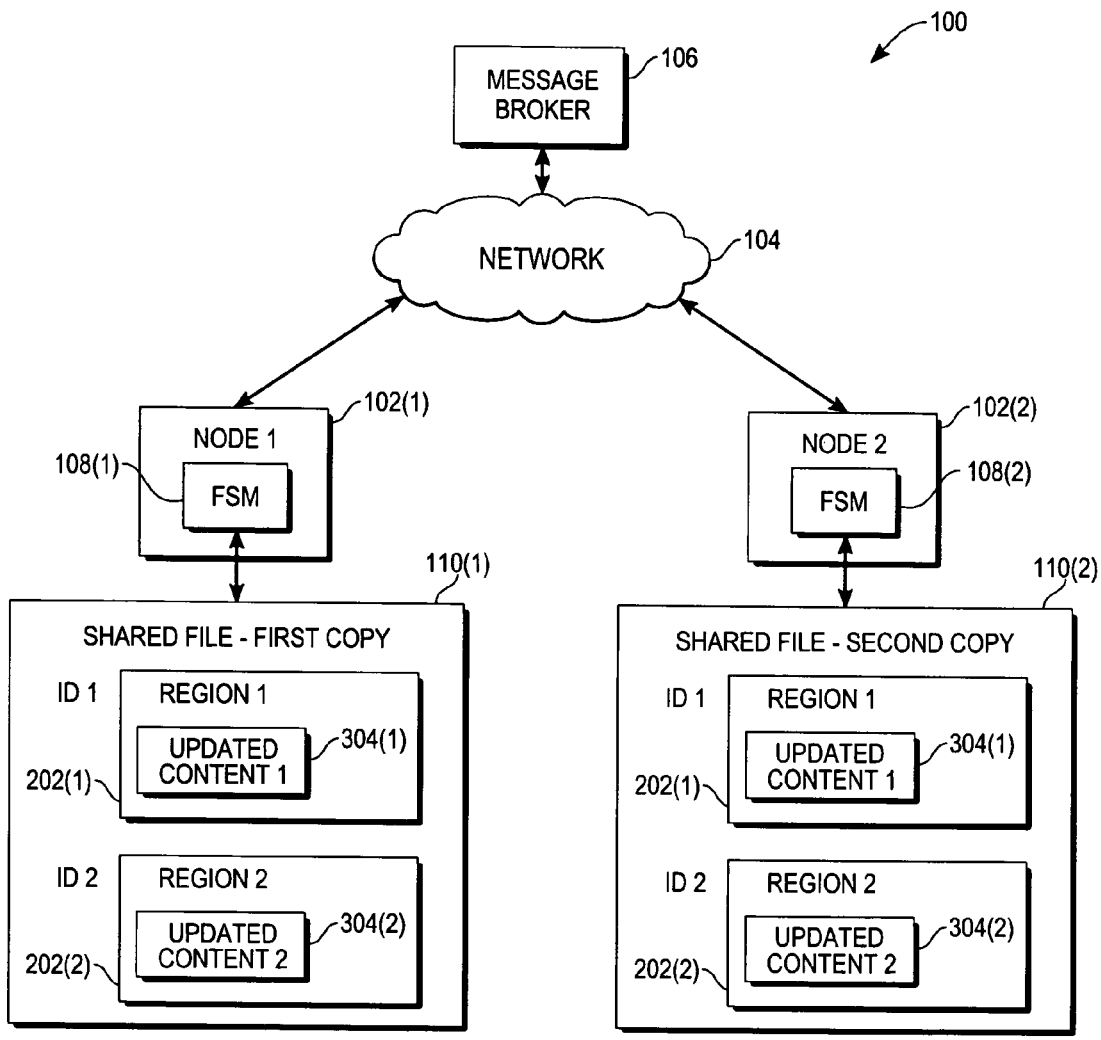

Similarly, upon receiving (block 410 of FIG. 4) the second update message, the FSM 108(1) on node 1 102(1) updates (block 412 of FIG. 4) the content in region 2 202(2) of the first copy 110(1) of the file with the second set of updated content 304(2) (see FIG. 3F). The second region 202(2) of the first copy 110(1) of the file is thus synchronized with the second region 202(2) of the second copy 110(2) of the file. Thereafter, the FSM 108(1) automatically refreshes (block 414 of FIG. 4) the display of the first copy 110(1) of the file to show the second set of updated content 304(2) in the second region 202(2). The first user on node 1 102(1) is thus able to see the updates made by the second user on node 2 102(2).

After the copies 110(1), 110(2) of the file are updated and synchronized, the FSM's 108(1), 108(2) may wish to release the locks on the regions 202(1), 202(2). This may be achieved with an exchange of unlock messages. Specifically, the FSM 108(1) on node 1 102(1) sends a first unlock message to the message broker 106 which comprises the ID (ID1) of region 1 202(1). The FSM 108(2) on node 2 102(2) sends a second unlock message to the message broker 106 which comprises the ID (ID2) of region 2 202(2). The message broker 106 forwards the first unlock message to node 2 102(2), and forwards the second unlock message to node 1 102(1). Upon receiving the first unlock message, the FSM 108(2) on node 2 102(2) releases the lock on region 1 202(1). Thus, region 1 202(1) of the second copy 110(2) of the file may once again be updated. Similarly, upon receiving the second unlock message, the FSM 108(1) on node 1 102(1) releases the lock on region 2 202(2). Thus, region 2 202(2) of the first copy 110(1) of the file may now be updated. Thereafter, collaborative sharing of the file may continue in the manner described above.

In the above example, each node was able to obtain a lock on the region that it wanted to lock. In some scenarios, this may not be the case. Under some limited circumstances, lock contention may occur. For example, suppose that the first user on node 1 102(1) is the first user to update region 1 202(1); thus, FSM 108(1) is the first FSM to send a lock message to lock region 1 202(1). Suppose that before the FSM 108(2) on node 2 102(2) receives the lock message and makes region 1 202(1) unupdatable, the second user on node 2 102(2) also updates region 1 202(1); thus, the FSM 108(2) on node 2 102(2) also sends a lock message to lock region 1 202(1). Because node 1 102(2) was the first to request the lock, it will get the lock on region 1 202(1). Node 2 102(2) will be denied the lock. In one embodiment, the following sequence of events takes place. Upon receiving the second lock message from node 2 102(2), the FSM 108(1) on node 1 102(1) sends a lock failed message to node 2 102(2) to indicate that the lock could not be granted. When the FSM 108(2) on node 2 102(2) receives this lock failed message, it informs the second user on node 2 102(2) that region 1 202(1) is currently locked and hence cannot be updated. The FSM 108(2) will also roll back any updates made by the second user to region 1 202(1). The lock conflict is thus resolved.

At some point, one or more of the nodes 102(1), 102(2) may wish to leave the file sharing session. To do so, the FSM 108 of the node 102 sends a leave message, comprising the session ID, to the message broker 106. In response, the message broker 106 removes that node's ID and network address from the session. When a leave message is received from the last node in a session, the message broker 106 removes the ID and network address of that node from the session, and closes the session. The file sharing is thus completed.

In the above example, for the sake of simplicity, only two nodes 102(1), 102(2) are shown, and only one file is shown as being shared. However, it should be noted that the concepts taught above may be applied generally to other arrangements. Specifically, for purposes of the present invention, any number of files can be shared in a file sharing session, and any number of nodes can participate in a file sharing session.

Also, the above example shows the first user on node 1 102(1) updating the content in region 1 202(1) at the same time that the second user on node 2 102(2) is updating the content in region 2 202(2). This was done merely to highlight the ability of the system 100 to enable multiple users to update the file at the same time. This is not required. In fact, any of the actions described above may take place at any time relative to other actions. For example, the first user on node 1 102(1) may update the content of region 1 202(1) before, after, or at the same time as the second user on node 2 102(2) is updating the content of region 2 202(2). Also, the first update message may be sent before, after, or at the same time as the second update message is received, and the second update message may be sent before, after, or at the same time as the first update message is received. In addition, the updating of the regions 202, and the refreshing of the displays may occur at any time. For example, the FSM 108(1) on node 1 102(1) may update region 2 202(2) with the second set of updated content 304(2) at the same time that the first user on node 1 102(1) is updating the content in region 1 202(1). Also, the FSM 108(1) on node 1 102(1) may refresh the first display to show the second set of updated content 304(2) in region 2 202(2) at the same time that the first user on node 1 102(1) is updating the content in region 1 202(1) (that way, the first user on node 1 102(1) is able to see the updates made by the second user on node 2 102(2) while the first user is updating the content in region 1 102(1)). Similarly, the FSM 108(2) on node 2 102(2) may update region 1 202(1) with the first set of updated content 304(1) at the same time that the second user on node 2 102(2) is updating the content in region 2 202(2). Also, the FSM 108(2) on node 2 102(2) may refresh the second display to show the first set of updated content 304(1) in region 1 202(1) at the same time that the second user on node 2 102(2) is updating the content in region 2 202(2) (hence, the second user on node 2 102(2) is able to see the updates made by the first user on node 1 102(1) while the second user is updating the content in region 2 102(2)). These and other orders of operation are possible and are within the scope of the present invention.

Hardware Overview

Figure 5:
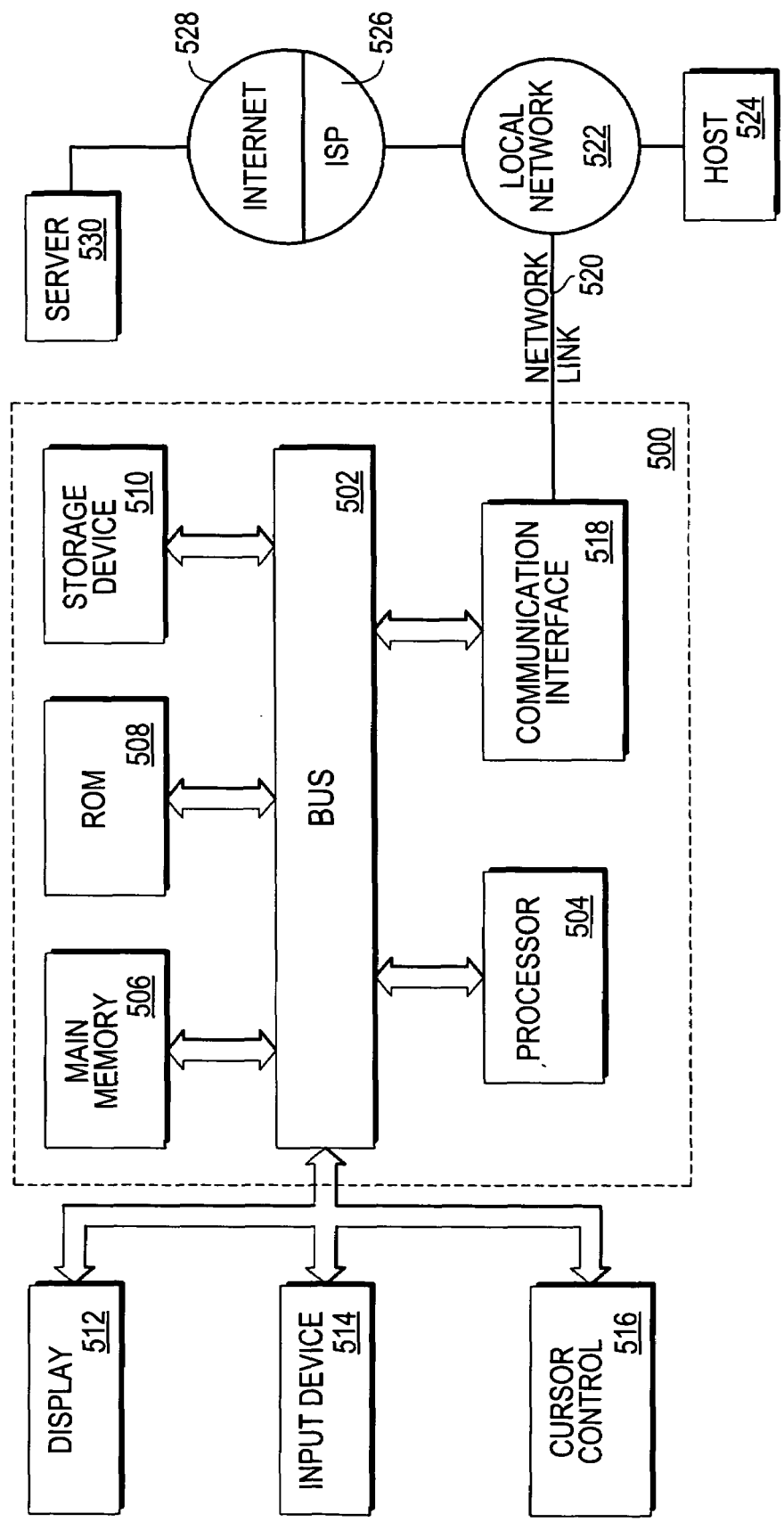
FIG. 5 is a block diagram of a general purpose computer system in which one embodiment of the present invention may be implemented.

FIG. 5 is a block diagram that illustrates a computer system 500 upon which an embodiment of the invention may be implemented. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may further be a network connection that connects one or more of the components. Any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A system, comprising:
   a first node;
   a second node; and
   a network for communicatively coupling the first and second nodes;
   wherein the first and second nodes share a file, the first node maintaining a first copy of the file and the second node maintaining a second copy of the file, the file having a first region comprising a first set of content and a second region comprising a second set of content; the first node generating a first display to show at least a portion of the first copy of the file and the second node generating a second display to show at least a portion of the second copy of the file;
   wherein the first node updates, based upon input received from a first user, the first region of the first copy of the file with a first set of updated content, the first node sending, to the second node, a first update message which comprises the first set of updated content, the second node receiving the first update message and automatically updating, without requiring action from a user of the second node, the first region of the second copy of the file with the first set of updated content, the second node automatically refreshing the second display so that it shows the first set of updated content in the first region; and
   wherein the second node updates, based upon input received from a second user, the second region of the second copy of the file with a second set of updated content, the second node sending, to the first node, a second update message which comprises the second set of updated content, the first node receiving the second update message and automatically updating, without requiring action from a user of the first node, the second region of the first copy of the file with the second set of updated content, the first node automatically refreshing the first display so that it shows the second set of updated content in the second region.

2. The system of claim 1, wherein the second node may update the second region of the second copy of the file at the same time that the first node is updating the first region of the first copy of the file.

3. The system of claim 1, wherein the first node sends a first lock message indicating that the first region of the file is being updated, the second node receiving the first lock message and, in response, disallowing any user updates to the first region of the second copy of the file.

4. The system of claim 3, wherein the first lock message does not prevent the second node from allowing user updates to the second region of the second copy of the file, so that the second node may update, based upon input from the second user, the second region of the second copy of the file even after the first region of the file has been locked.

5. The system of claim 4, wherein the second node sends a second lock message indicating that the second region of the file is being updated, the first node receiving the second lock message and, in response, disallowing any user updates to the second region of the first copy of the file.

6. The system of claim 5, wherein the second lock message does not prevent the first node from allowing user updates to the first region of the first copy of the file, so that the first node may update, based upon input from the first user, the first region of the first copy of the file even after the second region of the file has been locked.

7. The system of claim 1, wherein the first node, prior to updating the first region of the first copy of the file, determines whether the first region of the file has been locked.

8. The system of claim 7, wherein the second node, prior to updating the second region of the second copy of the file, determines whether the second region of the file has been locked.

9. The system of claim 1, wherein the first node may refresh the first display to show the second set of updated content in the second region at the same time that it is updating the first region of the first copy of the file with the first set of updated content.

10. The system of claim 9, wherein the second node may refresh the second display to show the first set of updated content in the first region at the same time that it is updating the second region of the second copy of the file with the second set of updated content.

11. The system of claim 1, wherein the system further comprises a message broker coupled to the network, wherein the message broker receives the first update message from the first node and forwards it to the second node, and wherein the message broker receives the second update message from the second node and forwards it to the first node.

12. The system of claim 1, wherein the first region of the file is associated with a first identifier and the second region of the file is associated with a second identifier, and wherein these region-identifier associations are kept consistent across all copies of the file so that the first region is associated with the first identifier in each copy of the file maintained by each node, and the second region is associated with the second identifier in each copy of the file maintained by each node.

13. The system of claim 12, wherein the first update message comprises the first identifier, and wherein the second update message comprises the second identifier.

14. The system of claim 1, wherein the first and second update messages are sent using an instant messaging protocol.

15. The system of claim 14, wherein the instant messaging protocol is XMPP (extensible messaging and presence protocol).

16. A method implemented by a particular node on a network, comprising:

maintaining a distinct copy of a file that is being shared with a group of one or more other nodes, wherein each node in the group of nodes maintains its own copy of the file, and wherein the file has a first region comprising a first set of content, and a second region comprising a second set of content;

generating a display to show at least a portion of the distinct copy of the file;

updating, based upon input received from a user of said particular node, the first set of content in the first region of the distinct copy of the file to give rise to a first set of updated content;

sending, to another node in the group of one or more other nodes, a first update message to inform the group of nodes that the first region of the file has been updated, the first update message comprising the first set of updated content to enable each node in the group of nodes to automatically update, without requiring action from a user of each node, the first region of its copy of the file with the first set of updated content;

receiving, from the other node in the group of one or more other nodes, a second update message indicating that one of the nodes in the group of nodes has updated the second region of its copy of the file with a second set of updated content, the second update message comprising the second set of updated content;

automatically updating, without requiring action from said user of said particular node, the second region of the distinct copy of the file with the second set of updated content; and automatically refreshing the display to show the second set of updated content in the second region.

17. The method of claim 16, further comprising:

sending a lock message to inform the group of nodes that the first region of the file is being updated, the lock message instructing each node in the group of nodes to not allow any user updates to the first region of its copy of the file.

18. The method of claim 17, wherein the lock message does not prevent the group of nodes from allowing user updates to the second region of the file, so that one of the nodes in the group of nodes may receive one or more user updates to the second region of its copy of the file while the first region of the file is locked.

19. The method of claim 16, further comprising:

prior to receiving the second update message:

receiving a lock message indicating that one of the nodes in the group of nodes is updating the second region of the file; and disallowing any user updates to the second region of the distinct copy of the file.

20. The method of claim 19, wherein the lock message does not prevent user updates to the first region of the file, so that the first region of the distinct copy of the file may be updated with the first set of updated content even after the second region of the file has been locked.

21. The method of claim 16, further comprising:

prior to updating the first set of content in the first region of the distinct copy of the file:

determining whether the first region of the file has been locked.

22. The method of claim 16, wherein the second region of the distinct copy of the file may be updated with the second set of updated content at the same time that the first region of the distinct copy of the file is being updated with the first set of updated content.

23. The method of claim 16, wherein the display may be refreshed to show the second set of updated content in the second region at the same time that the first region of the distinct copy of the file is being updated with the first set of updated content.

24. The method of claim 16, wherein the first update message is sent to a message broker which, in turn, sends the first update message to each of the nodes in the group of nodes.

25. The method of claim 16, wherein the second update message is received from a message broker which, in turn, received the second update message from one of the nodes in the group of nodes.

26. The method of claim 16, wherein the first region of the file is associated with a first identifier and the second region of the file is associated with a second identifier, and wherein these region-identifier associations are kept consistent across all copies of the file so that the first region is associated with the first identifier in each copy of the file maintained by each node, and the second region is associated with the second identifier in each copy of the file maintained by each node.

27. The method of claim 16, wherein the first update message is sent, and the second update message is received, using an instant messaging protocol.

28. The method of claim 27, wherein the instant messaging protocol is XMPP (extensible messaging and presence protocol).

29. A machine readable storage medium, comprising:

instructions for causing one or more processors to maintain a distinct copy of a file that is being shared by a particular node with a group of one or more other nodes, wherein each node in the group of nodes maintains its own copy of the file, and wherein the file has a first region comprising a first set of content, and a second region comprising a second set of content;

instructions for causing one or more processors to generate a display to show at least a portion of the distinct copy of the file;

instructions for causing one or more processors to update, based upon input received from a user of said particular node, the first set of content in the first region of the distinct copy of the file to give rise to a first set of updated content;

instructions for causing one or more processors to send, to another node in the group of one or more other nodes, a first update message to inform the group of nodes that the first region of the file has been updated, the first update message comprising the first set of updated content to enable each node in the group of nodes to automatically update, without requiring action from a user of each node, the first region of its copy of the file with the first set of updated content;

instructions for causing one or more processors to receive, from the other node in the group of one or more other nodes, a second update message indicating that one of the nodes in the group of nodes has updated the second region of its copy of the file with a second set of updated content, the second update message comprising the second set of updated content;

instructions for causing one or more processors to automatically update, without requiring action from said user of said particular node, the second region of the distinct copy of the file with the second set of updated content; and instructions for causing one or more processors to automatically refresh the display to show the second set of updated content in the second region.

30. The machine readable storage medium of claim 29, further comprising:

instructions for causing one or more processors to send a lock message to inform the group of nodes that the first region of the file is being updated, the lock message instructing each node in the group of nodes to not allow any user updates to the first region of its copy of the file.

31. The machine readable storage medium of claim 30, wherein the lock message does not prevent the group of nodes from allowing user updates to the second region of the file, so that one of the nodes in the group of nodes may receive one or more user updates to the second region of its copy of the file while the first region of the file is locked.

32. The machine readable storage medium of claim 29, further comprising:

instructions for causing one or more processors to receive, prior to receiving the second update message, a lock message indicating that one of the nodes in the group of nodes is updating the second region of the file; and instructions for causing one or more processors to disallow any user updates to the second region of the distinct copy of the file.

33. The machine readable storage medium of claim 32, wherein the lock message does not prevent user updates to the first region of the file, so that the first region of the distinct copy of the file may be updated with the first set of updated content even after the second region of the file has been locked.

34. The machine readable storage medium of claim 29, further comprising:

instructions for causing one or more processors to determine, prior to updating the first set of content in the first region of the distinct copy of the file, whether the first region of the file has been locked.

35. The machine readable storage medium of claim 29, wherein the second region of the distinct copy of the file may be updated with the second set of updated content at the same time that the first region of the distinct copy of the file is being updated with the first set of updated content.

36. The machine readable storage medium of claim 29, wherein the display may be refreshed to show the second set of updated content in the second region at the same time that the first region of the distinct copy of the file is being updated with the first set of updated content.

37. The machine readable storage medium of claim 29, wherein the first update message is sent to a message broker which, in turn, sends the first update message to each of the nodes in the group of nodes.

38. The machine readable storage medium of claim 29, wherein the second update message is received from a message broker which, in turn, received the second update message from one of the nodes in the group of nodes.

39. The machine readable storage medium of claim 29, wherein the first region of the file is associated with a first identifier and the second region of the file is associated with a second identifier, and wherein these region-identifier associations are kept consistent across all copies of the file so that the first region is associated with the first identifier in each copy of the file maintained by each node, and the second region is associated with the second identifier in each copy of the file maintained by each node.

40. The machine readable storage medium of claim 29, wherein the first update message is sent, and the second update message is received, using an instant messaging protocol.

41. The machine readable storage medium of claim 40, wherein the instant messaging protocol is XMPP (extensible messaging and presence protocol).

* * * * *